United States Patent
Curtis (10) Patent No.: US 11,467,067 B2
(45) Date of Patent: Oct. 11, 2022

(54) RAIL ASSESSMENT DEVICE (71) Applicant: Whiting Services, Inc., Thomasville, NC (US)

(72) Inventor: Johnny G. Curtis, Greensboro, NC (US)

(73) Assignee: Whiting Services, Inc., Thomasville, NC (US)

(*) Notice: Subject to any disclaimer, the term of this patent is extended or adjusted under 35 U.S.C. 154(b) by 333 days.

(21) Appl. No.: 16/836,328

(22) Filed: Mar. 31, 2020

(65) Prior Publication Data

US 2020/0309643 A1 Oct. 1, 2020

Related U.S. Application Data (60) Provisional application No. 62/827,518, filed on Apr. 1, 2019.

(51) Int. Cl.
G01M 99/00 (2011.01)
G01N 21/88 (2006.01)
G01S 13/08 (2006.01)
G01S 15/08 (2006.01)
G01S 17/08 (2006.01)
G01S 13/00 (2006.01)

(52) U.S. Cl.
CPC ...... G01M 99/008 (2013.01); G01N 21/8851 (2013.01); G01S 13/08 (2013.01); G01S 15/08 (2013.01); G01S 17/08 (2013.01)

(58) Field of Classification Search
CPC ...... B61L 23/04; B61L 23/042; B61L 23/044; B61L 23/045; B61L 23/047
See application file for complete search history.

(56) References Cited

U.S. PATENT DOCUMENTS

| 3,828,440 | A | * | 8/1974 | Plasser | E01B 35/00 |
| | | | | | 104/8 |
| 4,044,594 | A | * | 8/1977 | Owens | G01N 29/265 |
| | | | | | 73/636 |
| 4,468,966 | A | * | 9/1984 | Bradshaw | G01N 29/265 |
| | | | | | 73/636 |
| 4,502,389 | A | * | 3/1985 | Theurer | E01B 29/02 |
| | | | | | 104/2 |
| 5,623,244 | A | * | 4/1997 | Cooper | B61L 23/044 |
| | | | | | 246/166 |

(Continued)

FOREIGN PATENT DOCUMENTS

WO    WO 2007/087317    8/2007

OTHER PUBLICATIONS

InvenSense Inc., MPU-6000 and MPU-6050 Product Specification, Revision 3.4, Aug. 19, 2013.

(Continued)

*Primary Examiner* — Bernarr E Gregory
(74) *Attorney, Agent, or Firm* — Crowell & Moring LLP (57) ABSTRACT A travelling device may travel along a heavy machinery rail. The traveling device may collect positioning data to assess rail condition and/or installation. The positioning data may be collected using self-contained positioning sensors. Positional deviations indicating an elevated portion, a skewed portion, and/or a twisted portion of the heavy machinery rail may indicate issues with rail condition and/or installation.

20 Claims, 7 Drawing Sheets (56) References Cited

U.S. PATENT DOCUMENTS

| | | | | |
|---|---|---|---|---|
| 7,305,885 B2* | 12/2007 | Barshinger | .......... | G01N 29/262 |
| | | | | 73/633 |
| 8,914,171 B2* | 12/2014 | Noffsinger | ............ | B61L 23/044 |
| | | | | 701/19 |
| 9,255,913 B2* | 2/2016 | Kumar | ................ | G01N 29/265 |
| 9,784,579 B2 | 10/2017 | Sunio et al. | | |
| 2018/0222504 A1* | 8/2018 | Birch | .................... | B61L 23/044 |
| 2019/0367060 A1* | 12/2019 | Mesher | .................. | G01S 17/88 |

OTHER PUBLICATIONS

InvenSense Inc., MPU-9250 Product Specification, Revision 1.1, Jun. 20, 2016.

* cited by examiner

RAIL ASSESSMENT DEVICE

PRIORITY

This application claims priority to U.S. Provisional Application No. 62/827,518, filed Apr. 1, 2019, entitled Railbot, which is incorporated by reference in its entirety.

TECHNICAL FIELD

This disclosure relates to a device for rail positioning and condition assessment.

BACKGROUND

Heavy machinery, such as cranes, on rail installations are used in various industries include manufacturing, energy, and shipping. Cranes are capable of lifting loads of many tons while themselves weighing many tons. Thus, crane rails may experience large loads and large physical strain. Proper installation of rails is critical to on-site safety and avoidance of undue maintenance expenses. For example, in some cases, crane wheels alone may cost many thousands of dollars to replace. Accordingly, demand for systems to support proper installation and assessment of installed crane rail condition will remain high.

DETAILED DESCRIPTION

In some cases, rail installation and condition may be assessed through measurement of rail position and/or optical/visual inspection of the rail. For example, a traveling device may capture position data as it travels the span of a heavy machinery rail. Deviations in rail straightness, elevation, or twisting-type strains may cause the traveling device to detect deviations using position sensors. The travelling device may be used to determine whether a rail meets installation and/or safety guidelines.

In some cases, the travelling device may use self-contained positioning sensors. Self-contained positioning sensors may include positioning sensors that generate position data using resources contained within the sensor itself, such a gyroscopes, accelerometers, and/or magnetometers. Such self-contained positioning sensor may not necessarily be dependent on externally generated signals (such as laser and/or satellite signals) to generate position data. In some cases, non-self-contained positioning sensor may be used with the travelling device.

In the context of assessing rails for heavy industrial machinery, the use of self-contained sensors goes against the conventional wisdom. The technical problem of assessment of rail installation has previously been framed as a problem of obtaining a survey of the rail contours. Accordingly, existing market solutions approach the task of rail assessment using survey techniques and modified tools for such techniques. The use of self-contained sensors reframes the technical problem as a broader positioning data problem. Therefore, a selection of tools the conventional "survey" wisdom would overlook may be applied. For example, self-contained sensors used in navigation may be applied. The use of self-contained positioning sensors (potentially used in connection with non-self-contained sensors) may allow for faster rail assessment e.g., (tens of minutes, or assessment completed within a lunch break) whereas even survey techniques modified for speed may result in a day of downtime. In some cases, non-self-contained sensors relying on satellite signals may have limited position resolution. For example, in some cases, a deviation of ¼ inch over a span of 20 feet may cause a rail to be out of compliance with an example guideline. However, in some cases, achievable positioning resolutions from publically available positioning satellite systems may be a few centimeters to multiple feet. Further, signal reception may not necessarily be possible in all locations where a rail assessment may be desired.

Figure 1:
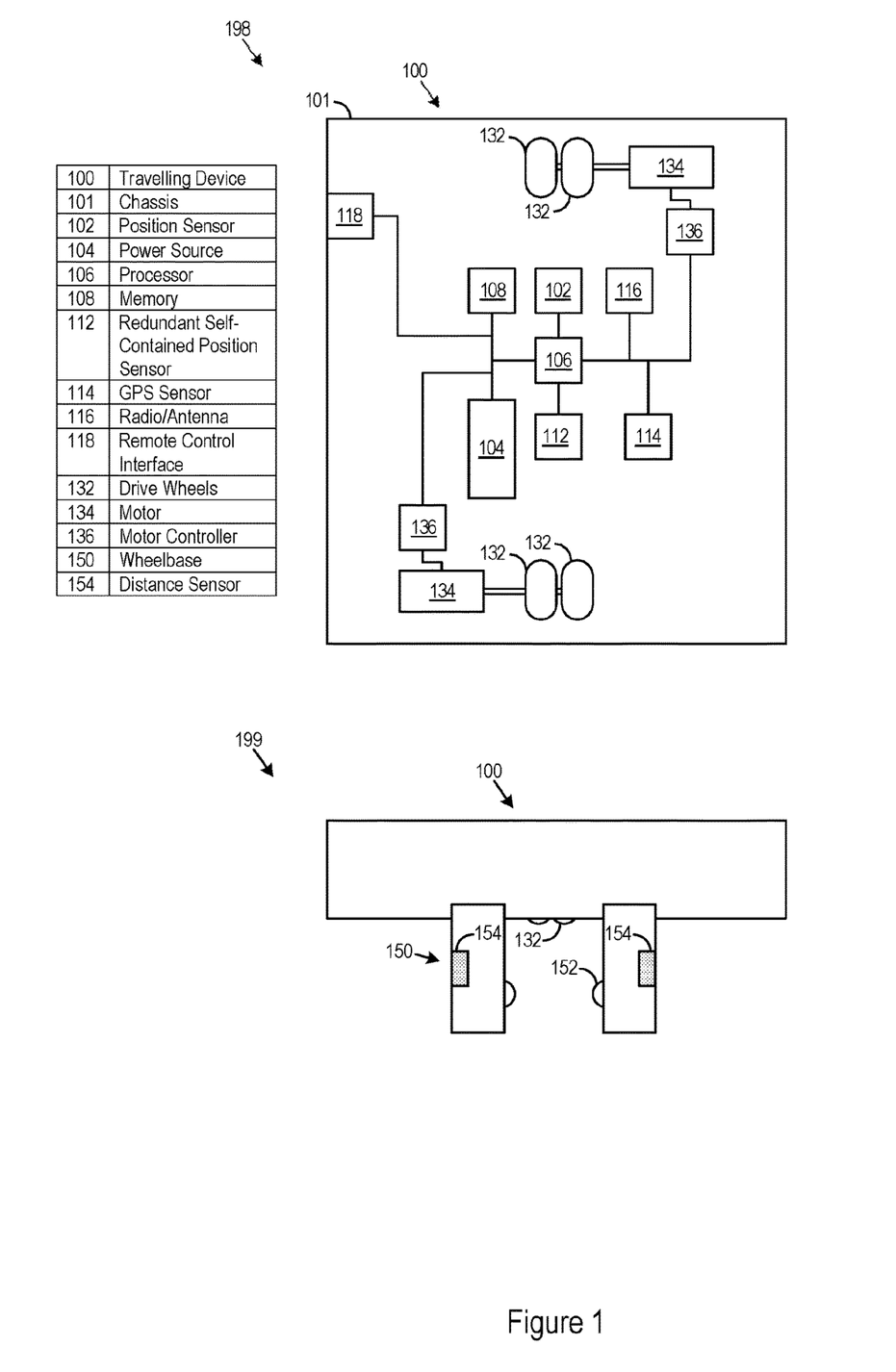
FIG. 1 shows cut-away and side views of an example travelling device with a wheelbase.

FIG. 1 shows cut-away and side views (198, 199) of an example travelling device 100 with a wheelbase 150. The example traveling device 100 may include a chassis 101 and a position sensor 102 (e.g., such as a self-contained position sensor). Optionally, the example traveling device may include a power source 104, a processor 106, memory 108, redundant self-contained position sensors 112, GPS sensors 114, radio/antenna (e.g., analog interfaces, data radio interfaces, Bluetooth, WiFi, cellular-data interfaces) 116, and/or remote control interface 118.

The wheelbase 150 may include one or more wheels 152. Optionally, the wheelbase 150 may include a motor, and a motor controller (not pictured). The one or more wheels may be spring loaded to couple to a variety of rail gauges. Further, the wheelbase 150 may be adjustable to accommodate a variety of rail gauges. A distance sensor 154 may be disposed on the wheelbase.

In some cases, such as where the wheelbase protrudes from the chassis 101, the chassis 101 may include drive wheels 132, a motor 134, and motor controller 136. Accordingly, an optional propulsion system may be located within the chassis 101 and/or in the wheelbase 150.

In some cases, the wheelbase 150 may be disposed on the chassis 101 such that the wheelbase may extend down into the grooves of an embedded rail. However, the wheelbase may be implemented in other configurations, such as one-sided configurations (e.g., configurations which grip the top and bottom of one side of the head of the rail), configurations embedded in the chassis 101, and other configurations.

The wheelbase may optionally include a distance sensor 154 such as a sonic distance sensor, an optical distance sensor, a radar distance sensor or other distance sensor. The distance sensors may measure a clearance from the rail (e.g., a rail center, edge or other reference point) to obstructions such as columns and other potential obstructions. The wheelbase may be positioned such that the wheels in the wheelbase run along the head of rail. In some cases, the wheelbase may be positioned such that the wheels in the wheelbase run along the web of the rail, or, in some cases, multiple sets of wheels may run along both the head and web of the rail.

In some cases, the traveling device 100 may include a laser and/or prism. In some implementations, the laser/prism may be used to execute a measurement of a total span of the rail prior to assessment. In some implementations, the laser/prism may be used to coordinate tandem operation between two traveling devices 100 each running along a single one of a pair of rails. The laser/prism pair (e.g., a laser source on one device reflecting off a prism mounted on the other) mounted on the travelling device may allow the traveling devices to gauge their relative distance as they travel along the pair of rails. Thus, relative deviations between the individual ones of the pair of rails may be determined.

Figure 2:
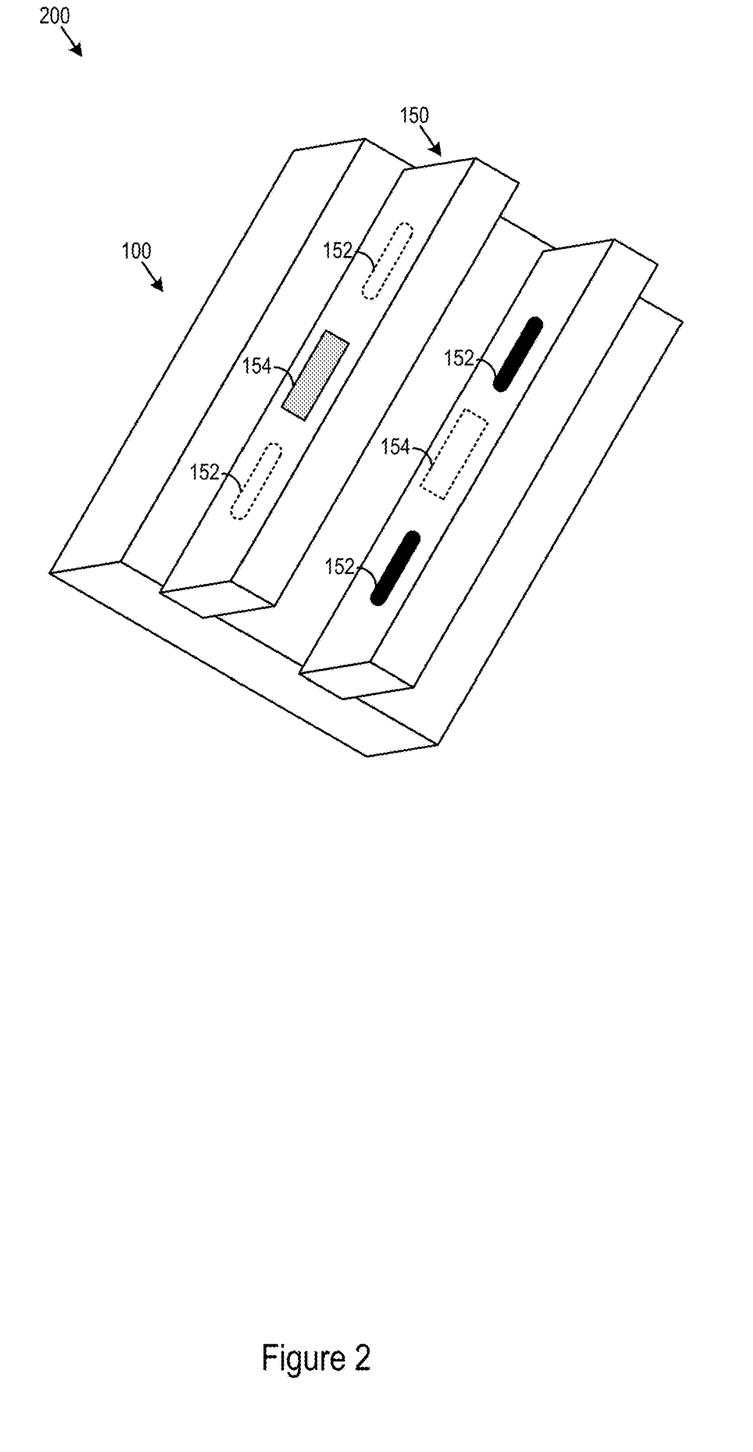
FIG. 2 shows a perspective view of the example travelling device.

FIG. 2 shows a perspective view 200 of the example travelling device 100.

Figure 3:
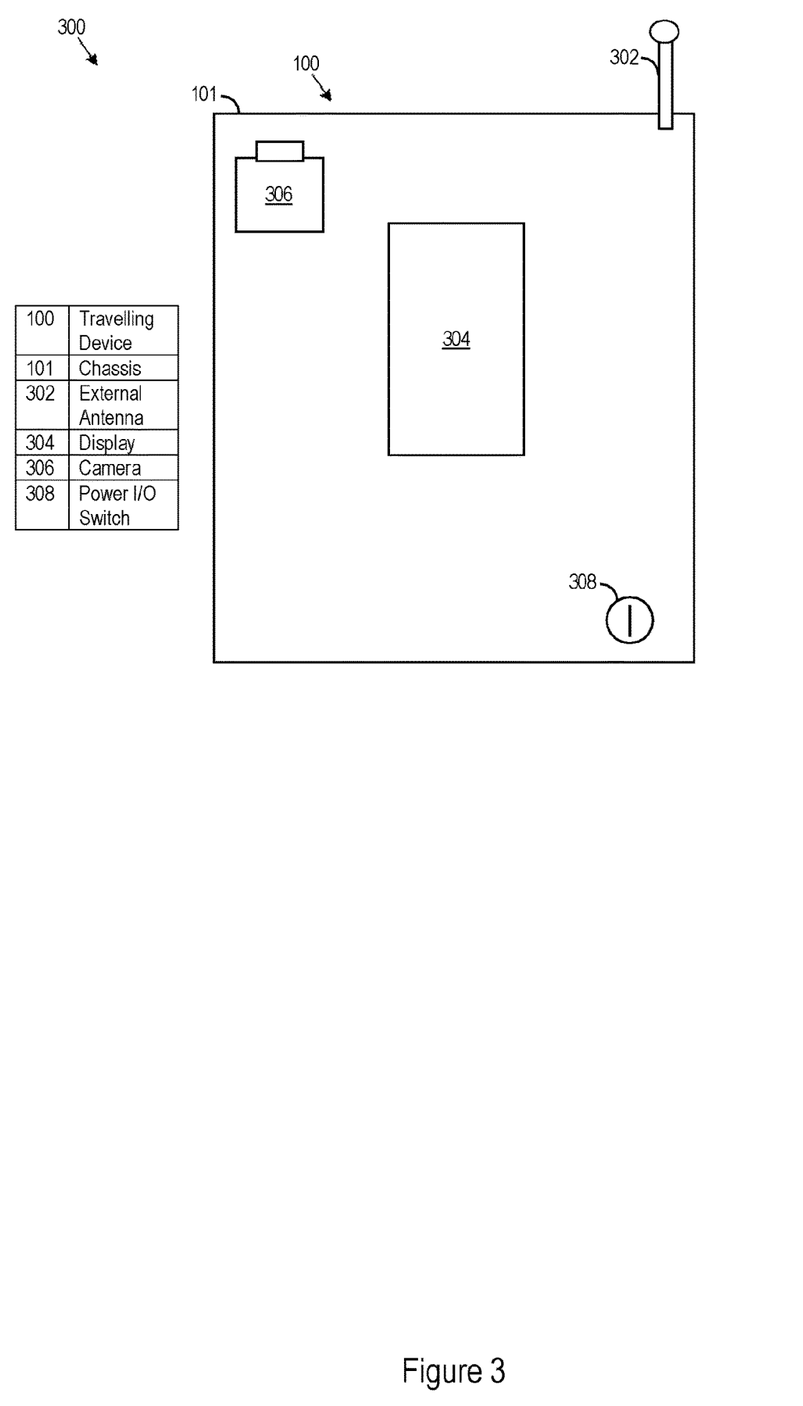
FIG. 3 shows a top view of the of the example travelling device.

FIG. 3 shows a top view 300 of the of the example travelling device 100. The traveling device 100 may include an external antenna 302, which may be removable in some implementations. The travelling device may include a display 304, which may be a touchscreen display in some implementations. The traveling device may include a camera 306, which may be removable in some implementations, and a power I/O switch 308. The travelling device 100 may be configure to assess a rail condition when the rail is in an unloaded state.

An example travelling device may include the TrackRunner® product provided by Whiting Services, Inc. However, various other travelling-device implementations may include or exclude features and/or components present in the TrackRunner® product.

Figure 4:
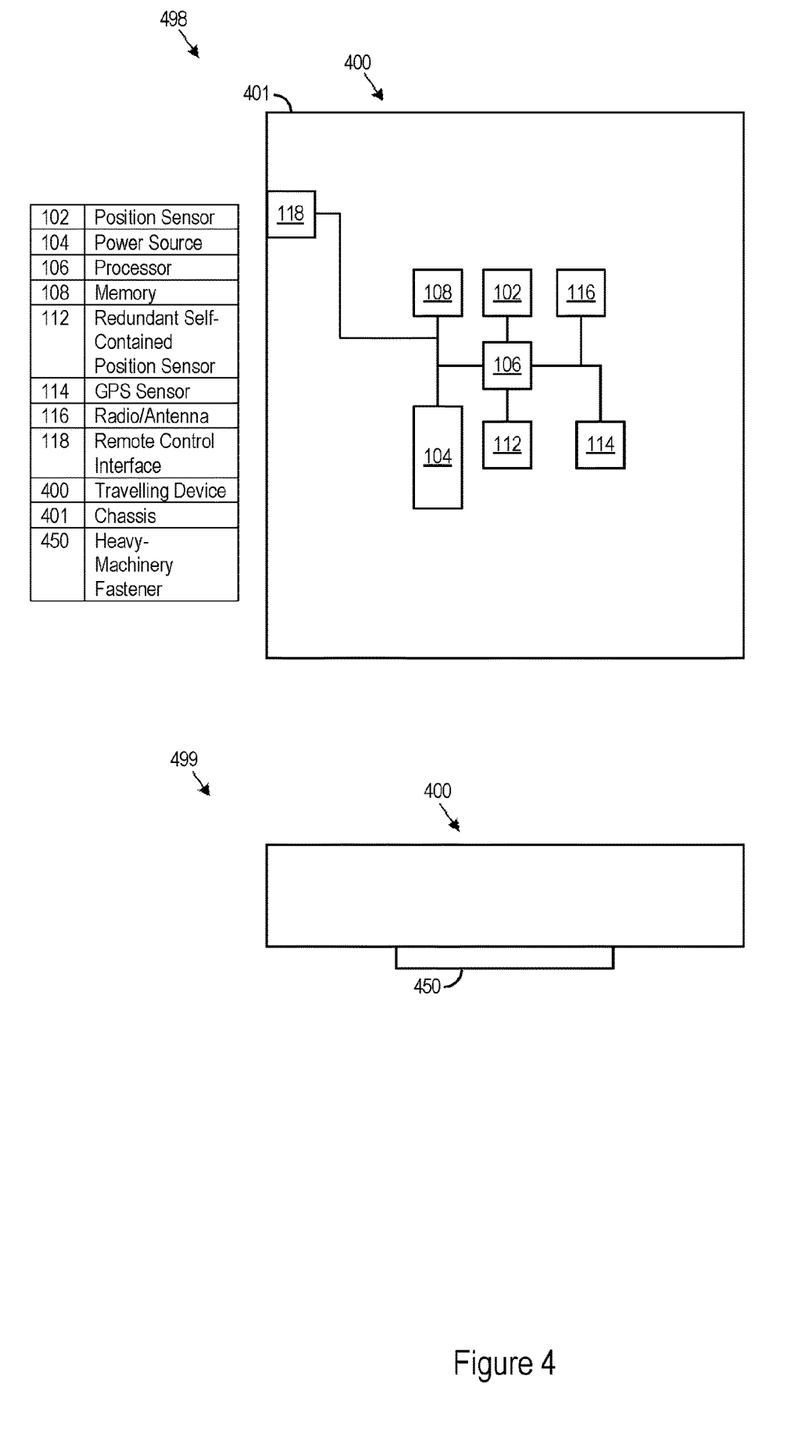
FIG. 4 shows cut-away and perspective views of a second example traveling device with a heavy-machinery fastener.

FIG. 4 shows cut-away and perspective views (498,499) of a second example traveling device 400 with a heavy-machinery fastener 450. The example traveling device 400 may include a chassis 401 and a position sensor 102 (e.g., such as a self-contained position sensor). Optionally, the example traveling device may include a power source 104, a processor 106, memory 108, redundant self-contained position sensors 112, GPS sensors 114, radio/antenna (e.g., analog interfaces, wireless data interfaces: Bluetooth, WiFi, cellular-data interfaces) 116, remote control interface 118.

The heavy-machinery attachment fastener 450 may include a fastening structure, such as a magnet, snap (e.g., male-female coupler) a socket (e.g., a specific socket structure configured to couple to a counter-part structure on the heavy-machinery, bolts, suction cup, or combination thereof, to couple to a heavy machinery exterior or chassis, such as a metallic chassis. In some cases, the heavy-machinery attachment fastener 450 may include a permanent fastener such as epoxy, solder, a weld, rivet, or other permanent fastener. In some cases, the second example travelling device 400 may be configured to capture position while the rail in a loaded state. For example, the second example travelling device 400 may measure rail deflection while heavy machinery (such as a crane) performs a loading action (e.g., a crane performing a lift, a transport cart being loaded with cargo, a forklift extending a jaw, a front-loader moving a bucket, a digger moving a shovel, or other loading action), or while heavy machinery traverses one or more rails without performing a loading action. In some cases, the second example travelling device 400 may measure rail deflection between support columns as the heavy machinery travels along the rail. In various implementations, support columns may be used to suspend the rail above a ground or floor levels. Support columns may be oriented vertically and spaced apart by an inter-column spacing. In some cases, a periodic deflection pattern (that reflects the inter-column spacing) may be expected for a rail in good condition. In some cases, an anomalous amount of deflection (compared to other sections (e.g., sections defined by the inter-column spacing) of rail) may provide an indication of rail wear, damage, deterioration, or other rail degradation.

In various implementations, a travelling device 100, 400 may use the memory 108 to store position data (e.g., rail deflection position (e.g., elevation and/or from straight along the span) or rail rotation data (e.g., rail twist which may change the angle of rail head with respect to the floor (or rail mount)) as the data is captured by the position sensors. The memory may also include code or other operational software instructions that may be used to operate the travelling device 100, 400.

The wireless data interfaces and/or the remote control interfaces may be used to control the traveling device remotely. In some cases, the remote control interface may also be used to send telemetry data to or from the device. The wireless data interface may also allow a remote user to access captured position data in real-time.

The power source of the travelling device 100, 400 may include a battery, a battery charger, and/or a wired power socket that may be used to power device and/or charge the battery.

The camera, which may be included in various implementations, may be used to capture optical images of the rail. In some cases, an automated software algorithm (such as a human-trained machine learning algorithm) and/or a person may review the images to determine points along the rail that may correspond to damage or deterioration of the rail. In some cases, the camera may be disposed on the exterior of the travelling device 100, 400 or disposed within the chassis with a window from which to view the rail.

The self-contained position sensor may capture position data. In some cases, a positional deviation of more than ¼ inch over a span of 20 feet may constitute an out-of-tolerance deviation. In some cases, positional resolutions that are finer than that which could detect an out-of-tolerance deviation are captured. For example, a positional resolution of up to ¹/₆₄ inch (deviation) over a span of 100 feet or greater resolution may be used. In some cases, one or more single-axis (any one axis) position sensors may be used. In some cases, one or more two-axis position (e.g. x/z roll/pitch) sensors may be used. In some cases, one or more three-axis sensors (x/y/z roll/pitch/yaw) may be used. For example, a MPU-9250 position sensor and/or a MPU-6050 position sensor may be used. In some cases, up to three or more independently calibrated and independently operational three-axis sensors may be used as redundancy sensors. Anomalous data from a single sensor may be rejected in view of consistent data from other sensors.

In various implementations, the position sensor (or the processor's response to the raw output of the position sensor) may be calibrated to place the starting point of the travelling device 100, 400 (e.g., for a new data collection run) at an origin (e.g., a zero point for the one or more axes of the sensor).

In various implementations, the processor 106 may be used to process and/or compile position data captured by the sensors. The processor may compile the data into various forms (comma separated value data, columnar data, or other data forms). The processor may also be used to execute software to access and/or control positions sensors, GPS sensors, data interfaces, and/or execute software commands.

Figure 5:
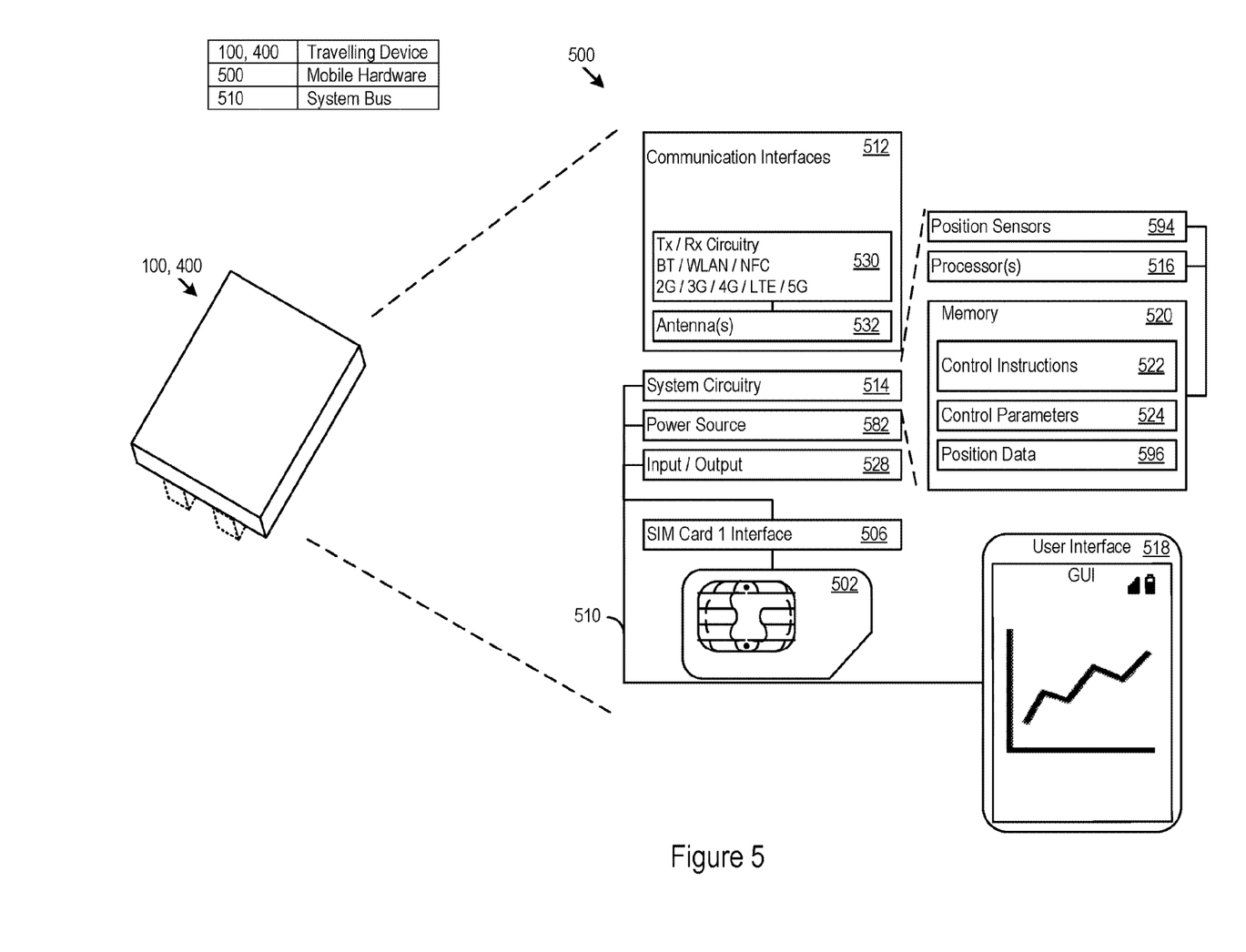
FIG. 5 shows example mobile hardware.

FIG. 5 shows example mobile hardware 500, which may be used as an example sensing/computing backbone of the traveling device 100, 400. In this example, the mobile hardware 500 may support one or more Subscriber Identity Modules (SIMs), such as the SIM1 502. Electrical and physical interface 506 connects SIM1 502 to the rest of the user equipment hardware, for example, through the system bus 510.

The mobile hardware 500 includes communication interfaces 512, system logic 514, and a user interface 518. The system logic 514 may include any combination of hardware, software, firmware, or other logic. The system logic 514 may be implemented, for example, with one or more systems on a chip (SoC), application specific integrated circuits (ASIC), discrete analog and digital circuits, and/or other circuitry. The system logic 514 is part of the implementation of any desired functionality in the mobile hardware 500. In that regard, the system logic 514 may include logic that facilitates, as examples, running applications; accepting user inputs; saving and retrieving application data; establishing, maintaining, and terminating data connections for, as one example, Internet connectivity; establishing, maintaining, and terminating wireless network connections, Bluetooth connections, or other connections; and/or displaying relevant information on the user interface 518. The user interface 518 and the inputs 528 may include a graphical user interface, touch sensitive display, haptic feedback or other haptic output, voice or facial recognition inputs, buttons, switches, speakers and other user interface elements. Additional examples of the inputs 528 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 514 may include one or more processors 516 and memories 520. The memory 520 stores, for example, control instructions 522 that the processor 516 executes to carry out desired functionality for the mobile hardware 500. The control parameters 524 provide and specify configuration and operating options for the control instructions 522. The memory 520 may also store any BT, WiFi, 3G, 4G, 5G or other data that the mobile hardware 500 will send, or has received, through the communication interfaces 512.

In various implementations, the system power may be supplied by a power source 582, such as a battery.

The system circuitry may further include position sensors 594 which may supply position data 596, which may be stored in the memory 520.

In the communication interfaces 512, Radio Frequency (RF) transmit (Tx) and receive (Rx) circuitry 530 handles transmission and reception of signals through one or more antennas 532. The communication interface 512 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 512 may include transceivers that support transmission and reception under the 2G, 3G, BT, WiFi, Universal Mobile Telecommunications System (UMTS), High Speed Packet Access (HSPA)+, and 4G/Long Term Evolution (LTE), 5G standards. The techniques described below, however, are applicable to other wireless communications technologies whether arising from the 3rd Generation Partnership Project (3GPP), GSM Association, 3GPP2, IEEE, or other partnerships or standards bodies.

Figure 6:
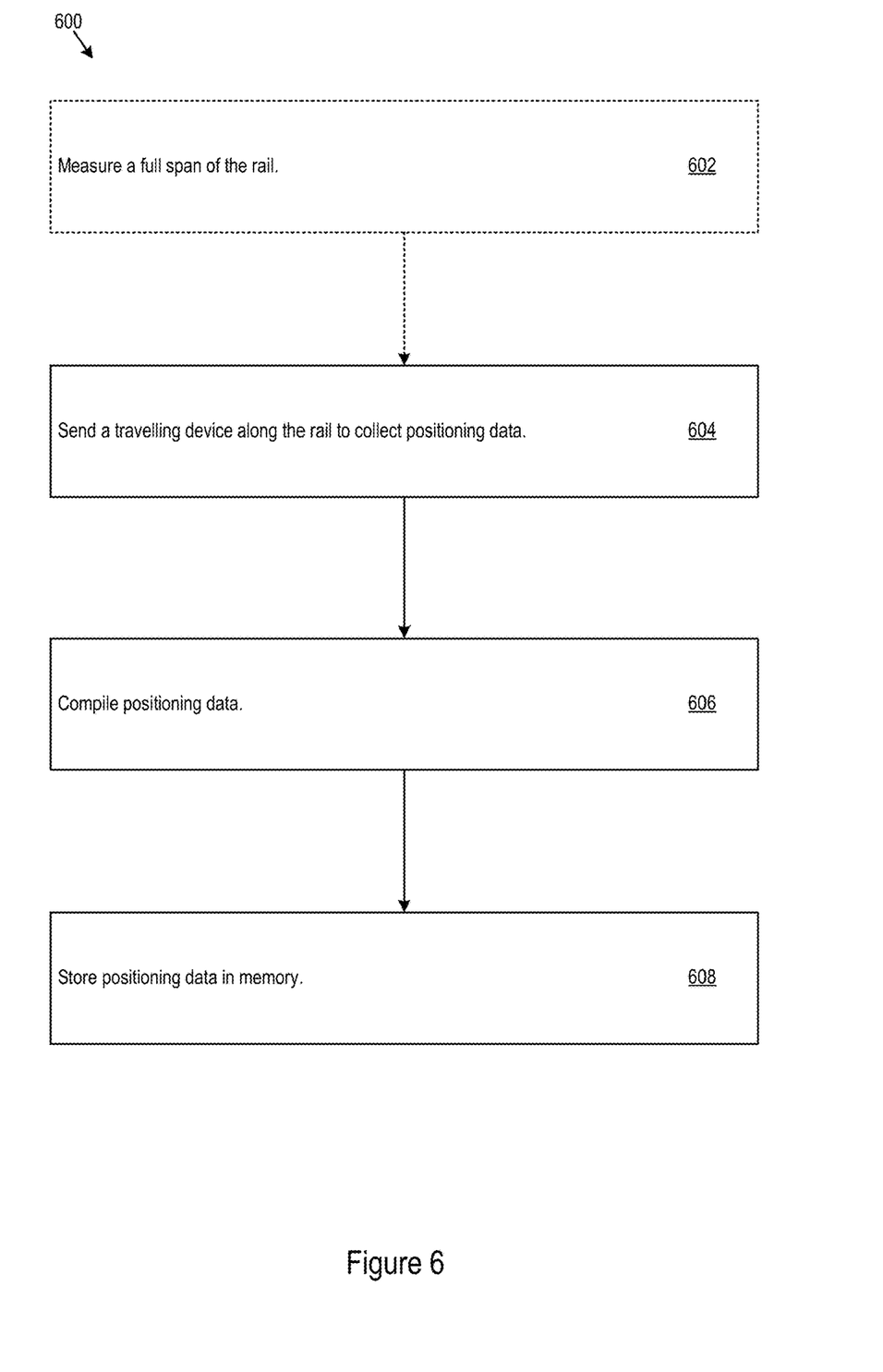
FIG. 6 shows an example method for assessing rail condition.

FIG. 6 shows an example method 600 for assessing rail condition, including loaded and/or unloaded rail condition. Optionally, measure a full span of the rail (602). Send a traveling device along the rail to collect positioning data (604). Compile the positioning data (606). Store the positioning data on the memory (608).

Figure 7:
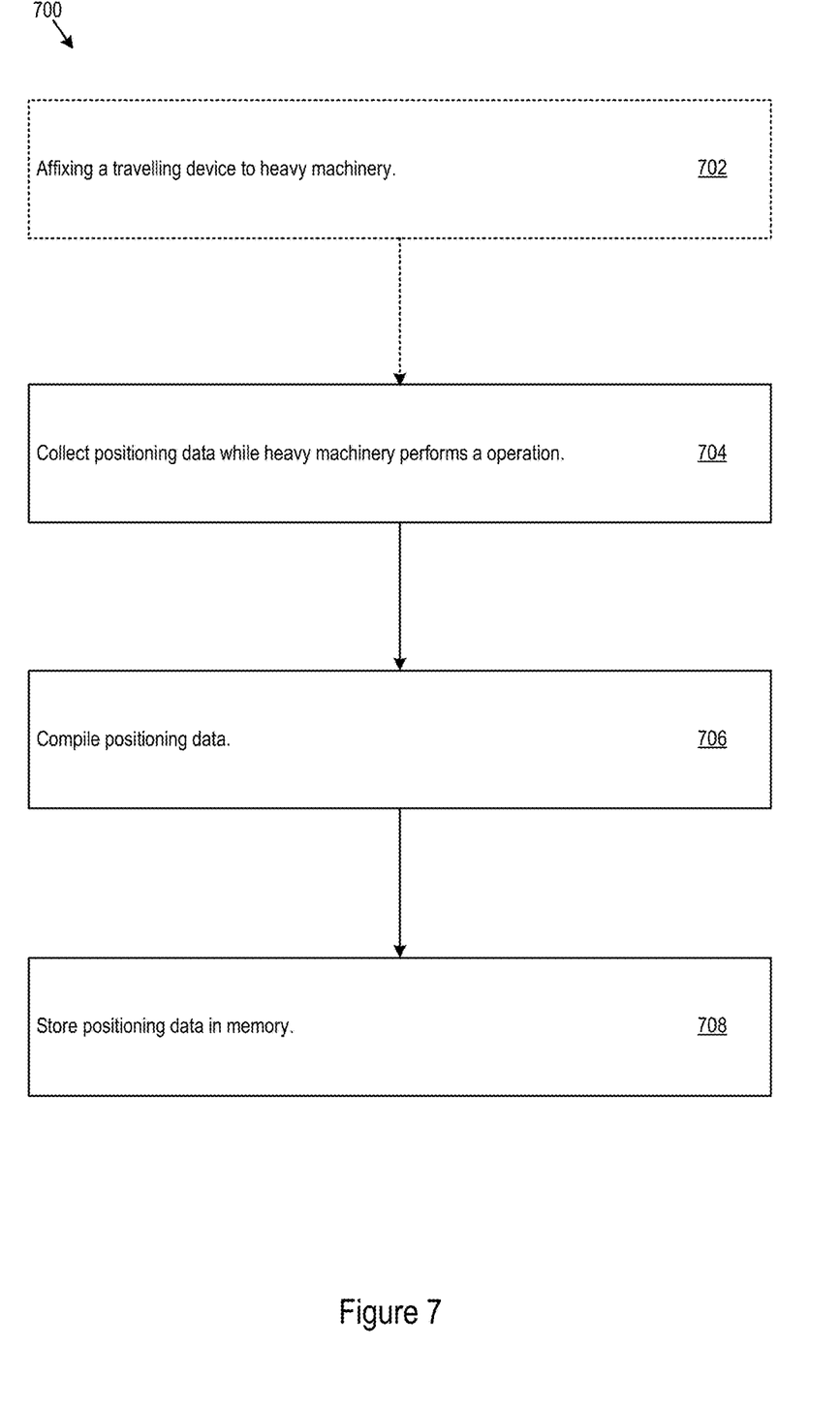
FIG. 7 shows an example method for assessing loaded rail condition.

FIG. 7 shows an example method 700 for assessing loaded rail condition. Collect positional data while heavy machinery performs an operation (e.g., a loading action, a traversal of a portion of the rail, or other operation) (704). Compile the positioning data (706). Store the positioning data on the memory (708).

In various implementations, the travelling device may be temporarily affixed to the heavy machinery. Accordingly, the travelling device may optionally be affixed to the heavy machinery prior to performance of the operation (702).

The architectures and techniques discussed above (in some cases within the context of illustrative examples) demonstrate general principles and structures which may be implemented in various examples:

A1 In an example, a device includes: a chassis; a wheelbase coupled to the chassis, the wheelbase configured to couple to a heavy machinery rail; a motor configured to provide propulsion to the wheelbase to cause the device to travel along the heavy machinery rail; and a self-contained position sensor disposed within the chassis, the self-contained position sensor configured to provide positional data for the heavy machinery rail when the device travels along the heavy machinery rail.

A2 In an example, a device includes: a chassis; a wheelbase coupled to the chassis, the wheelbase configured to couple to a heavy machinery rail; a motor to provide propulsion to the wheelbase along a direction of travel along the heavy machinery rail; and a position sensor disposed within the chassis, the position sensor configured to generate rotational position data for rotation about a rotational axis parallel to a direction of travel along the heavy machinery rail.

A3 The device of any of the preceding examples where: the wheelbase is coupled to the bottom of the chassis; and the wheelbase is positioned to hold the chassis above the rail.

A4 The device of any of the preceding examples where a wheel of the wheelbase is positioned to run along a head of the rail, a web of the rail, or both.

A5 The device of any of the preceding examples where a drive wheel is coupled to the motor to propel the device along the heavy machinery rail; and optionally, the drive wheel is disposed within the chassis.

A6 The device of any of the preceding examples where a wheel of the wheelbase is spring-loaded.

B1 In an example, a device includes: a chassis; a heavy machinery attachment fastener to affix the chassis to heavy machinery; and a self-contained position sensor disposed within the chassis, the self-contained position sensor configured to provide positional data for a rail when the chassis is affixed to the heavy machinery and the heavy machinery operates while on the rail.

B2 In an example, a device includes: a chassis; a heavy machinery attachment fastener to affix the chassis to heavy machinery; and a position sensor disposed within the chassis, the position sensor configured to generate rotational position data for rotation about a rotational axis parallel to a direction of travel along a rail when the chassis is affixed to the heavy machinery and the heavy machinery operates while on the rail.

B3 The device of example B1 or B2 where, the heavy machinery attachment fastener includes a magnet configured to attach to a metallic heavy machinery chassis.

B4 The device of any of examples B1-B3, where the heavy machinery attachment fastener includes a specific socket configured to couple to a counterpart socket disposed on a heavy machinery chassis of the heavy machinery.

B5 The device of any of examples B1-B3, where the position sensor is configured to generate position data when the rail is in a loaded state.

C1 The device of any of the preceding examples where the device further includes memory disposed within the chassis configured to store data from the position sensors.

C2 The device of any of the preceding examples where device further includes: an antenna; and a radio configured to transmit output from the position sensor.

C3 The device of example C2 or any of the preceding examples, where the device further includes: memory; and the radio includes a wireless data interface.

C4 The device of example C3 or any of the preceding examples, where the wireless data interface includes a Wi-Fi compliant interface, a Bluetooth compliant interface, a cellular data interface, or any combination thereof.

C5 The device of example C3, C4, or any of the preceding examples, where the device in configured to accept command input from the wireless data interface.

C6 The device of any of the preceding examples where the device includes a power source.

C7 The device of example C5 or any of the preceding examples where the power source includes a battery, a wired power input, or both.

C8 The device of any of the preceding examples, where the device further includes a camera disposed on the chassis.

C9 The device of example C8 or any of the preceding examples where the camera is configured to capture images of the rail when the device travels along the rail.

C10 The device of any of the preceding examples where the position sensor includes a three-axis position sensor.

C11 The device of any of the preceding examples where the position sensor is configured to generate a relative position measurement.

C12 The device of any of the preceding examples where the position sensor includes an accelerometer, a gyroscope, or both.

C13 The device of any of the preceding examples where the position sensor is configured to measure pitch, roll, yaw, or any combination thereof.

C14 The device of any of the preceding examples where the device includes one or more redundancy position sensors configured to independently generate data redundant with the positional data.

C15 The device of example C2, C8 or any of the preceding examples where the camera, the antenna or both are disposed on the exterior of the chassis.

C16 The device of example C15 or any of the preceding examples where the camera, the antenna or both are removable from the device.

C17 The device of example C2, C8 or any of the preceding examples where the camera, the antenna or both are disposed within the chassis.

C18 The device of any of the preceding examples where the device further includes a distance measuring sensor disposed within the chassis to measure clearance from the center of the rail.

C19 The device of example C18 or any of the preceding examples where the distance measuring sensor includes a sonic sensor, a laser ranging sensor, an optical sensor, or any combination thereof.

C20 The device of any of the preceding examples where the device further includes a microprocessor configured to process the position data, compile the position data of both.

C21 The device of any of the preceding examples where the device further includes a display.

C22 The device of C21 or any of the preceding examples where the display includes a touchscreen interface.

D1 A method of manufacture: providing, disposing and/or coupling any of or any combination of the components of any of the preceding examples.

E1 In an example, a method includes: optionally, measuring a span of a rail; causing a travelling device to traverse the rail along the span; and capturing, via a self-contained position sensor of the traveling device, position data as the travelling device to traverses the rail along the span; and compiling the position data in reference to the rail.

E2 The method of example E1, where measure the span of the rail include using a tape measure, a laser ranging device, or both.

E3 The method of either example E1 or E2 where the rail including one of a pair of rails; and the method further includes repeating the other steps of the method on the other of the pair of rails.

F1 In an example, a method includes: affixing a travelling device to machinery disposed on a rail; causing the machinery to perform an operation while on the rail; and while the machinery performs the operation, collecting positional data via a self-contained position sensor of the travelling device.

F2 The method of example F1, where the operation includes performance of a loading action, a traversal of at least a portion of the rail, or both.

F3 The method of either example F1 or F2, where: causing the machinery to perform an operation includes causing the machinery to traverse a portion of the rail; and collecting positional data includes capturing a pattern in elevation data for the rail, the pattern formed as a result of rail flex between support columns and loading the rail with the machinery.

F4 The method of any of examples F1-F3, further including identifying a degraded rail section by determining that elevation data for the degraded rail section deviates from the pattern.

G1 The method of any of the preceding examples, further including calibrating the travelling device to place a starting point of the travelling device at an axis origin.

G2 The method of any of the preceding examples, further including capturing a set of images of the rail while traversing the rail; optionally reviewing the set of images for a subset of images including visual indications of degradation; and optionally tagging the subset of images.

H1 The method of any of the preceding examples using the device of any of the preceding examples.

Various implementations have been specifically described. However, many other implementations are also possible.

What is claimed is:
1. A device including:
a chassis;
a plurality of wheels coupled to the chassis, the plurality of wheels configured to couple to engage a rail;
a motor configured to cause the device to travel along the rail; and a self-contained position sensor fixed relative to the chassis, the self-contained position sensor configured to provide positional data for the rail when the device travels along the rail.

2. The device of claim 1, where:
the plurality of wheels are coupled to the bottom of the chassis; and
the plurality of wheels are positioned to hold the chassis above the rail.

3. The device of claim 1, where a wheel of the plurality of wheels is positioned to run along a head of the rail.

4. The device of claim 1, where the device further includes memory disposed within the chassis configured to store data from the self-contained position sensor.

5. The device of claim 1, where the device further includes:
an antenna; and
a radio configured to transmit output from the self-contained position sensor.

6. The device of claim 1, where the device further includes a camera disposed on the chassis, the camera configured to capture images of the rail when the device travels along the rail.

7. The device of claim 1, where the self-contained position sensor includes a three-axis position sensor.

8. The device of claim 1, where the device includes one or more redundancy position sensors configured to independently generate data redundant with the positional data.

9. The device of claim 1, where the device further includes a distance measuring sensor disposed within the chassis to measure clearance from the center of the rail.

10. The device of claim 9, where the distance measuring sensor includes a sonic sensor, a laser ranging sensor, an optical sensor, or any combination thereof.

11. The device of claim 1, where a wheel of plurality of wheels is positioned to run along a web of the rail.

12. The device of claim 1, where a first wheel of plurality of wheels is positioned to run along a head of the rail, and a second wheel of the plurality of wheels is positioned to run along a web of the rail.

13. The device of claim 1, where a first wheel of the plurality of wheels is rotatable about a first axis generally parallel to a lower surface of the chassis, and a second wheel of the plurality of wheels is rotatable about a second axis generally perpendicular to the first axis, the second wheel being positioned below the first wheel.

14. The device of claim 13, where the second wheel of the plurality of wheels is positioned entirely below the chassis.

15. The device of claim 1, where at least one wheel of the plurality of wheels is spring-loaded to accommodate a variety of rail types.

16. The device of claim 1, where a wheelbase at least partially defined by the plurality of wheels is selectively adjustable to accommodate a variety of rail types.

17. The device of claim 1, where a first wheel of the plurality of wheels is operatively coupled to the motor, and a second wheel of the plurality of wheels is operatively coupled to a second motor.

18. The device of claim 1, where at least two wheels of the plurality of wheels are operatively coupled to the motor.

19. The device of claim 1, where the device further includes a battery operatively coupled to the motor.

20. The device of claim 1, where the device further includes a display operatively coupled to a processor and the self-contained position sensor.

* * * * *

UNITED STATES PATENT AND TRADEMARK OFFICE
CERTIFICATE OF CORRECTION

| | |
|---|---|
| PATENT NO. | : 11,467,067 B2 |
| APPLICATION NO. | : 16/836328 |
| DATED | : October 11, 2022 |
| INVENTOR(S) | : Johnny G. Curtis |

It is certified that error appears in the above-identified patent and that said Letters Patent is hereby corrected as shown below:

In the Claims

In Column 8, Claim 1, Line 65, delete "to couple"

Signed and Sealed this
Fifteenth Day of November, 2022

*Katherine Kelly Vidal*

Katherine Kelly Vidal
*Director of the United States Patent and Trademark Office*